US008755273B2

(12) United States Patent
Calvanese Strinati (10) Patent No.: US 8,755,273 B2
(45) Date of Patent: Jun. 17, 2014

(54) SCHEDULING METHOD WITH POWER SAVINGS

(75) Inventor: Emilio Calvanese Strinati, Grenoble (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 193 days.

(21) Appl. No.: 13/152,703

(22) Filed: Jun. 3, 2011

(65) Prior Publication Data

US 2011/0299445 A1    Dec. 8, 2011

(30) Foreign Application Priority Data

Jun. 4, 2010    (FR) ...................................... 10 54416

(51) Int. Cl.
H04J 3/14    (2006.01)
H04J 3/16    (2006.01)

(52) U.S. Cl.
USPC .......................................... 370/230; 370/468

(58) Field of Classification Search
USPC ................. 370/229–234, 311, 395.4, 395.41, 370/395.42, 395.43, 468
See application file for complete search history.

(56) References Cited

U.S. PATENT DOCUMENTS

| | | | |
|---|---|---|---|
| 5,566,165 A * | 10/1996 | Sawahashi et al. ........... | 370/342 |
| 7,623,489 B2 * | 11/2009 | Ishii et al. ..................... | 370/329 |
| 7,653,078 B2 * | 1/2010 | Ishii et al. ..................... | 370/412 |
| 7,719,973 B2 * | 5/2010 | Abedi ........................... | 370/230 |
| 7,734,805 B2 * | 6/2010 | Balachandran et al. ...... | 709/232 |
| 2004/0252693 A1 * | 12/2004 | Cheriton et al. ........... | 370/395.1 |
| 2005/0130694 A1 * | 6/2005 | Medvedev et al. ............ | 455/522 |
| 2005/0141421 A1 * | 6/2005 | Ishii et al. ..................... | 370/230 |
| 2007/0025357 A1 * | 2/2007 | Zhang et al. ............... | 370/395.4 |
| 2008/0123520 A1 * | 5/2008 | Ji et al. .......................... | 370/216 |
| 2009/0046788 A1 * | 2/2009 | Kotecha ....................... | 375/260 |
| 2010/0061321 A1 | 3/2010 | Calvanese Strinati et al. | |
| 2011/0158194 A1 * | 6/2011 | Musikka et al. .............. | 370/329 |

FOREIGN PATENT DOCUMENTS

EP    2 148 478 A1    1/2010
WO    WO 2005/015769 A2    2/2005

OTHER PUBLICATIONS

European Search Report issued Jun. 21, 2011 in Patent Application No. EP 11 16 8370 with Translation of Category of Cited Documents.
Guowang Miao et al., "Energy-Efficient Design in Wireless OFDMA", Communications, 2008. ICC '08. IEEE International Conference on, IEEE, XP-031265943, May 19, 2008, pp. 3307-3312.
Louay M. A. Jalloul et al., "Coverage Analysis for IEEE 802.16e/ WiMAX Systems", IEEE Transactions on Wireless Communications, vol. 7, No. 11, XP-011238930, Nov. 1, 2008, pp. 4627-4634.

(Continued)

*Primary Examiner* — Hong Cho
(74) *Attorney, Agent, or Firm* — Oblon, Spivak, McClelland, Maier & Neustadt, L.L.P.

(57) ABSTRACT

The present invention relates to a scheduling method in a multi-user communication system. Said method categorises packets from different users as urgent packets and non-urgent packets, assigns to urgent packets the transmission resources for obtaining the best link qualities by giving preference to the most urgent packets, assigns to non-urgent packets the remaining resources, and transmits each non-urgent packet with a transmission power lower than that which would be necessary for transmitting it with a maximum spectral efficiency, in view of the quality of service required on the link.

8 Claims, 5 Drawing Sheets

(56) References Cited

OTHER PUBLICATIONS

Matthew Andrews et al., "Providing Quality of Service Over a Shared Wireless Link", IEEE Communications Magazine, Feb. 2001, pp. 150-154.

A. Pokhariyal et al., "Performance of Downlink Frequency Domain Packet Scheduling for the UTRAN Long Term Evolution", The 17th Annual IEEE International Symposium on Personal, Indoor and Mobile Radio Communications (PIRMC '06), Sep. 2006.

* cited by examiner

SCHEDULING METHOD WITH POWER SAVINGS

TECHNICAL FIELD

The present invention generally relates to multi-user type communication systems. It is in particular applicable to OFDMA (Orthogonal Frequency Division Multiple Access) type systems, for example in WiMAX or 3GPP/LTE systems.

STATE OF PRIOR ART

Wireless communication systems generally have to share transmission resources (transmission frequency, orthogonal codes, subcarrier intervals within a OFDM multiplex) among different users so as to ensure their access to the network.

The process consisting in allocating, at each transmission interval, a transmission resource to a user is called "scheduling". There also are in the literature such expressions as a packet scheduling (data from users being transmitted by packets) or priority scheduling. In any case, those skilled in the art will understand that the purpose is, for each interval, to assign to different users (or more generally to different flows or queues) transmission resources, meeting some priority or equity rules, if any. Scheduling is thus distinguished from the mere resource allocation in that it manages access of users to these resources.

Generally, the scheduling method takes advantage of the frequency and/or time and/or space diversity to fulfil at best some criteria such as the total sum throughput for the different users, the equity among users, the required qualities of services (QoS), etc.

Several scheduling methods are known in the state of the art, in particular for downlinks of OFDMA (Orthogonal Frequency Division Multiple Access) communication systems, for example the "3GPP UTRAN long-term evolution" system also called 3GPP/LTE.

The scheduling method called MCI or Max C/I (Maximum Channel to Interference ratio) aims at maximising the instantaneous throughput of the system, taken over all the users. For example, if $RB_1, RB_2, \ldots, RB_N$ designate the transmission resources of the system and, for each resource $RB_n$, $\eta_n^k$ designates the signal to noise ratio of the link of user k on the resource $RB_n$, the scheduling method assigns the resource $RB_n$ to the user who will be able to take the best advantage thereof, in other words to the user $k_m^{MCI}$, such that:

$$k_m^{MCI} = \mathrm{argmax}_k(\eta_n^k) \qquad (1)$$

It will be noted that this scheduling method does not take account of the quality of service (QoS) levels required for the different users.

A description of the MCI scheduling method is, for example, found in a paper of A. Pokhariyal et al. entitled "Performance of downlink frequency domain packet scheduling for the UTRAN long term evolution", published in Proc. of IEEE International Symposium on PIRMC, September 2006.

The scheduling method called PF (Proportional Fair) aims at maximising the throughput of the different users with respect to their average transmission conditions. More precisely, keeping the same references as above, the resource $RB_n$ is assigned to the user $k_m^{PF}$, such that:

$$k_m^{PF} = \mathrm{argmax}\left(\frac{\eta_n^k}{\overline{\eta}_n^k}\right) \qquad (2)$$

where $\overline{\eta}_n^k$ is the average value of the signal to noise ratio $\eta_n^k$ during an observation window.

The PF scheduling method is efficient for a quality of service level of the Best Effort type but is ill-suited to managing traffics of the real time type, because the duration of the observation window is substantially longer than the lifetime of the packets.

On the contrary, the scheduling method called EDF (Earliest Deadline First) is designed to give priority to users subjected to constraints of the real time type. More precisely, the remaining lifetimes or TTL (Time To Live) of packets associated with different users are categorised and the most urgent packets (having the lowest TTL value) are assigned the resources providing the best link quality. Therefore, it is ensured that packets of the real time type are routed depending on the degree of urgency thereof.

The scheduling method called MLWDF (Modified Largest Weighted Deadline First) has been proposed in order to take account of the coexistence, within a same system, of a real time traffic (RT traffic) and a non-real time traffic (NRT traffic). The object of this method is to steadily maintain the size of queues of packets to different users (throughput optimal). More precisely, for each transmission time interval t, the queue of the packet to the user:

$$k_m^{MLWDF} = \mathrm{argmax}_k(\gamma_k W_k(t) r_k(t)) \qquad (3)$$

is served, where $W_k(t)$ is the packet delay altering the head of the queue for the user k, $r_k$ is the link capacity of the user k and $\gamma_k$ is a weighting coefficient. A judicious choice for the weighting coefficients $\gamma_k$ enables the delay altering packets of each user to be maintained lower than a predetermined threshold value, depending on the required quality of service. However, choosing the weighting coefficients is quite difficult and may substantially alter system performance.

A description of the scheduling method MLWDF is found in the paper of M. Andrews et al. entitled "Providing quality of service over a shared wireless link" published in IEEE Communications Magazine, February 2001, pp. 150-154.

Besides, reducing the transmission power consumption is necessary to sustain the autonomy of mobile phones. In particular, it has been proposed to reduce this power consumption using a resource allocation method and an uplink adaptation, as described in the paper of G. Miao et al. entitled "Energy efficient design in Wireless OFDMA" published in Proc. IEEE 2008 International Conference on Comm., May 2008. However, this method does not take into account the real time traffic constraints within the system. This transmission power reduction issue now extends to downlinks.

The problem underlying the invention is therefore to provide a method for scheduling transmission resources enabling the power consumption to be reduced in a multi-user communication system while taking into account the real time traffic constraints.

DESCRIPTION OF THE INVENTION

The present invention is defined by a scheduling method in a multi-user communication system, said method assigning to each packet of a user a transmission resource from a plurality of transmission resources during a transmission time interval, characterised by:

(a) categorising the packets from different users into urgent packets and non-urgent packets;

(b) assigning to urgent packets the transmission resources for obtaining the best link qualities by giving preference to the most urgent packets;

(c) assigning to non-urgent packets the remaining resources;

(d) transmitting each non-urgent packet using the thus assigned resource and with a transmission power lower than that which would be necessary to transmit it with a maximum spectral efficiency, in view of the quality of service required on the link.

Advantageously, step (b) includes assigning to urgent packets the transmission resources providing the highest link qualities, a packet being assigned a transmission resource providing a link quality as high as such packet is urgent.

Preferably, step (c) includes assigning to each non-urgent packet the remaining transmission resource for obtaining the highest link quality.

A first embodiment includes, for each non-urgent packet, determining the modulation and coding scheme ($MCS_{n,k}^{max}$) with the greatest spectral efficiency ($\lambda_{n,k}^{max}$) and the emission power ($P_{n,k}^{max}$) for obtaining a quality of service ($QoS_k$) required on the link using the transmission resource ($RB_n$) assigned to the packet, checking whether this spectral efficiency ($\lambda_{n,k}^{max}$) is higher than that ($\lambda_{low-power}$) of a predetermined robust modulation and coding scheme and, if so, using in step (d) this scheme for transmitting said non-urgent packet with an emission power lower than that previously determined.

Typically, if a packet belongs to a flow of the real time type, it is categorised as urgent if its remaining lifetime is lower than a predetermined threshold and as non-urgent in the opposite case.

In the case of a system of the HARQ type, if a packet belongs to a flow of the real time type, it is categorised as urgent if its remaining lifetime is lower than a predetermined threshold minus a time margin depending on the maximum number of retransmissions of the packet and as non-urgent in the opposite case.

Said threshold can be determined by the procedure for allowing users into said system.

If a packet belongs to a non real time type flow, it is categorised as urgent if the flow to which it belongs has not been served until then at the quality of service required for this flow.

In particular, a packet k belonging to a flow i is considered as urgent at the time $t_i$ if $(TW_i-t_i) \leq (QoS_i-q_i)/R_{min}$ where $TW_i$ is the duration of an observation window, $t_i$ is the time elapsed since the beginning of this window, $QoS_i$ is the quality of service required for the flow i, expressed as the amount of data to be transmitted during said observation window, $q_i$ is the amount of data actually transmitted since the beginning of the observation window and $R_{min}$ is the minimum rate on the link.

According to a second embodiment, in step (c) includes:

assigning a remaining transmission resource to a packet for which maximum power savings may be obtained, at the required quality of service, between a first modulation and coding scheme and a second modulation and coding scheme, said first scheme ($MCS_{k,n}^{max}$) having a maximum spectral efficiency from a plurality of possible schemes, said second scheme ($MCS_{k,n}^{min}$) having a minimum spectral efficiency from the same plurality;

using the second scheme for transmitting said packet with a lowered power for obtaining said required quality of service.

BRIEF DESCRIPTION OF THE DRAWINGS

Further characteristics and advantages of the invention will become apparent upon reading a preferred embodiment of the invention made with reference to the appended figures in which.

DETAILED DESCRIPTION OF PARTICULAR EMBODIMENTS

The following will consider a wireless communication system of the multi-user type, including a base station and a plurality of mobile equipments, UEs (User Equipments). For the purpose of mere illustration and without loss of generality, it will be assumed that the communication system is of the OFDMA type and the resources to be allocated to different users during a transmission interval or TTI (Time Transmission Interval), are subcarrier intervals of OFDMA multiplex (chunks).

The hypothesis will be that of a downlink, the scheduling method being then implemented at the base station (node B) and determining for each packet to a user the transmission resource (chunk) to be allocated thereto.

Figure 1:
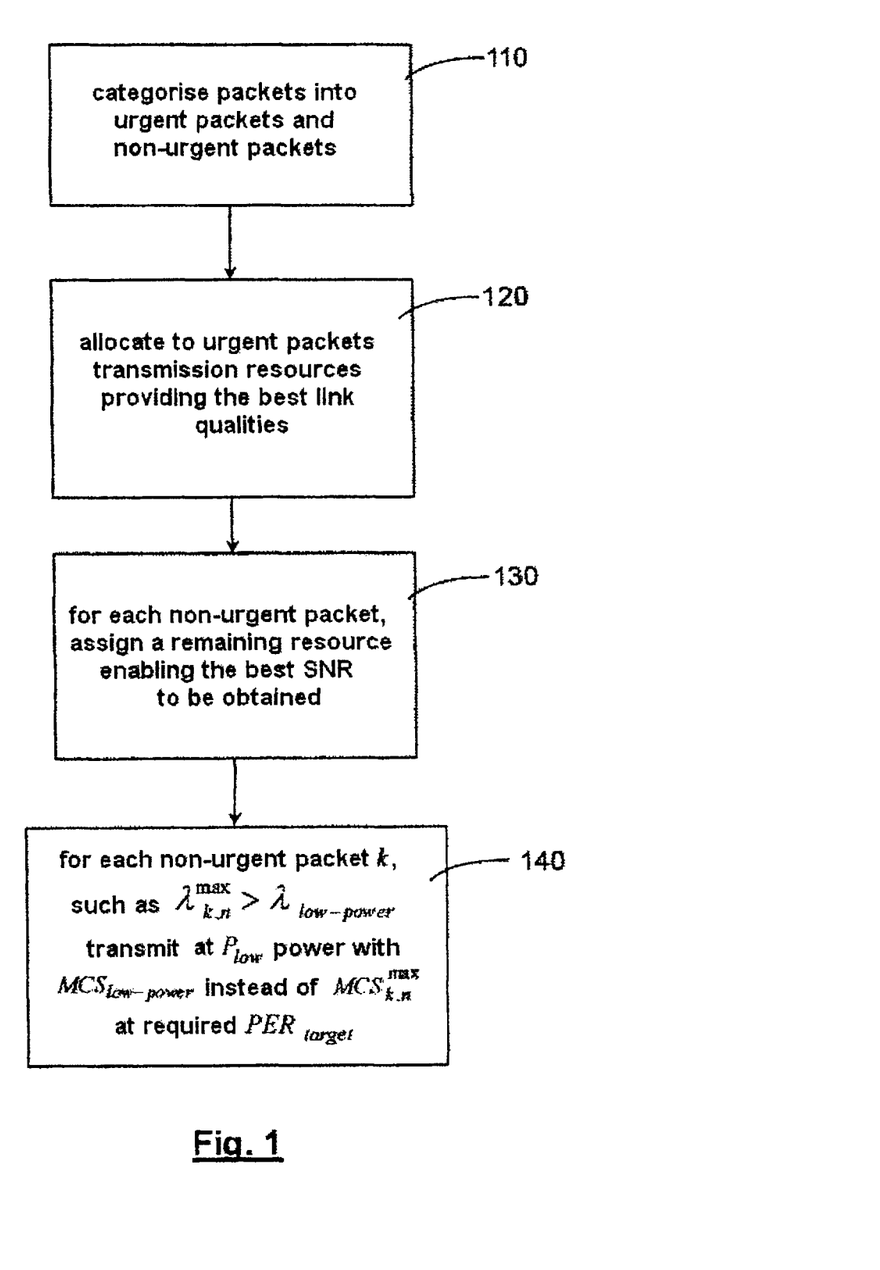
FIG. 1 schematically represents a scheduling method according to a first embodiment of the invention.

The scheduling method according to a first embodiment is schematically represented in FIG. 1.

The traffic of users can be of the real time (RT) type, for example Voice over IP (VoIP), Near Real Time video (NRTV), or else non real time, for example of data routing. In the general case, there is a mixed traffic with packets flows of the real time (RT) type and others of the non real time (NRT) type.

In a first step 110, a sorting of the urgent and non-urgent packets is performed.

The packet flows of the real time (RT) and non real time (NRT) types are first distinguished.

When a packet belongs to a RT flow, its remaining lifetime, that is the remaining time for its delivery to the recipient user, is determined.

In practice, a packet to a user will be considered as urgent if its remaining lifetime (Remaining Time To Live), $R_{TTL}$ satisfies:

$$R_{TTL} \leq Th_{rush} \cdot \tau_{TTL} - \eta \quad (4)$$

where $\tau_{TTL}$ is an elemental time, $Th_{rush}$ is a threshold value and $\eta$ is a predetermined positive constant, taking into account the duration of the transmission interval TTI and the maximum number of possible retransmissions of a packet, in case of using a retransmission protocol of a HARQ (Hybrid Automatic Repeat reQuest) type packet on the link. It is recalled that a packet belonging to a RT flow is given a lifetime or TTL (Time to Live), corresponding to the maximum allowable latency. In other words, a packet transmitted with a given lifetime TTL should be delivered to the recipient within the time TTL.

More precisely, relationship (4) means that if the remaining lifetime of the packet is lower than a predetermined threshold value (which may furthermore depend on the required quality of service), the packet is categorised as urgent and in consequently processed as a priority by the scheduling method. As set out above, when a HARQ protocol is used on the link, a time margin (η) is advantageously provided for taking account of the delay introduced by possible retransmissions when the received packet is erroneous.

Conversely, packets belonging to RT flows not satisfying relationship (4) are declared as non urgent.

Packets belonging to NRT flows will now be considered. The packet of an NRT flow will be declared as urgent if the recipient user of this flow has only been served until now below the level required by its quality of service (QoS). More precisely, if $QoS_i$ designates the quality of service required for the flow i, a packet of this flow will be considered as urgent at the time $t_i$ if:

$$(TW_i - t_i) \leq (QoS_i - q_i)/R_{min} \quad (5)$$

where $TW_i$ is the duration of an observation window, substantially longer than the duration of a transmission interval TTI, $t_i$ is the time elapsed since the beginning of this observation window, $QoS_i$ is the quality of service expressed as the amount of data to be routed during said observation window, $q_i$ is the amount of data actually transmitted since the beginning of this window, and $R_{min}$ is the minimum rate on the link.

Relationship (5) means that if the amount of data remaining to be transmitted on the link until the end of the observation window is higher than that which may be transmitted with the minimum rate during this lapse of time, the recipient user of this flow has not been served as required by the specified quality of service and packets of this flow remaining to be transmitted are considered as urgent.

$\Omega_{rush}$ will designate all the urgent packets for the considered transmission interval and $\Omega_{non-rush}$ will designate all the non-urgent packets.

In a second step, 120, the scheduling method assigns to urgent packets the best transmission resources in terms of link quality, for example in terms of signal to noise ratio. According to an exemplary embodiment, the scheduling is performed according to an EDF (Earliest Deadline First) type method.

More precisely, packets of $\Omega_{rush}$ are categorised depending on degrees of urgency thereof.

Generally, it will be first considered that packets of $\Omega_{rush}$ belonging to RT flows are more urgent than those of $\Omega_{rush}$ belonging to NRT flows.

Packets of RT flows are advantageously categorised depending on their remaining lifetimes. Thus, a packet with a remaining lifetime $R_{TTL}^1$, will be considered as more urgent than a packet with a remaining lifetime $R_{TTL}^2$ if and only if:

$$R_{TTL}^1 < R_{TTL}^2 \quad (6)$$

Packets of $\Omega_{rush}$ relating to NRT flows will be advantageously categorised depending on service deficiencies for these flows, a packet with a higher deficiency (in absolute value) being considered as more urgent than a packet with a flow of lesser deficiency.

For example, the service deficiency $D_i$ of a flow i could be assessed by:

$$D_i = q_i - QoS_i \frac{t_i}{TW_i} \quad (7)$$

After they have been categorised according to their degree of urgency, the most urgent packets are assigned the transmission resources providing the best link quality.

Figure 2:
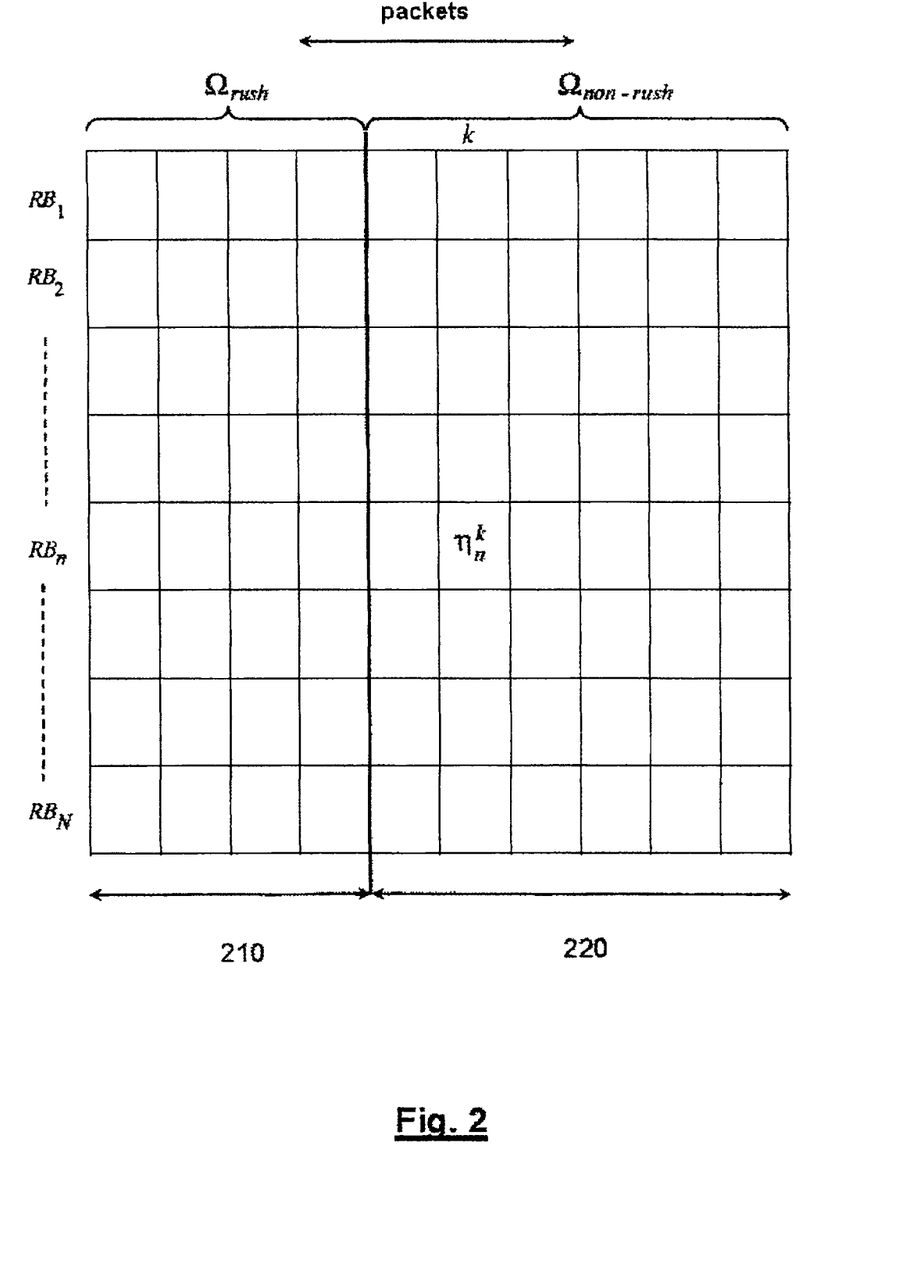
FIG. 2 represents a link quality matrix used by the scheduling method of FIG. 1.

FIG. 2 shows a matrix the rows of which correspond to different transmission resources $RB_1, \ldots, RB_N$ and the columns of which correspond to the different packets to be transmitted. Each packet belongs to a flow directed toward a user k. A distinction has been made, in 210, of urgent packets, and in 220, of non-urgent packets. Urgent packets are categorised by increasing order of urgency from right to left. Non-urgent packets are not categorised.

For a packet to be transmitted to a user k, and for each possible transmission resource n, $\eta_n^k$ designates the quality of the downlink to k if it uses the resource n. This link quality can be, for example, expressed as a signal to noise ratio. The link quality can be determined from a Channel Quality Indicator (CQI) fed back from the user to the base station.

During the assigning procedure of step 120, the columns are swept from left to right and the available transmission resource corresponding to the highest link quality is chosen for each column (that is for each packet).

When all the urgent packets have been processed, the method proceeds to step 130.

In step 130, packets declared as non-urgent are assigned resources from those not yet assigned in the previous step.

For each available resource, that is each resource not yet allocated in the previous step, the packet for which the link quality using this resource is the highest is determined. This packet is then assigned the resource enabling the maximum link quality to be obtained. Choosing the best link quality enables the best spectral efficiency and, therefore, the highest rate, to be obtained.

The link quality may be measured in terms of signal to noise ratio, or else directly in terms of maximum rate on the link.

It will be understood that scheduling non-urgent packets is therefore carried out according to a MCI type method.

If several packets enable the maximum link quality to be obtained (for example if a user receives several flows), then only one of these packets is assigned the relevant resource. The assigned resource is declared unavailable and the assigning process proceeds with another resource.

In step 140, only the non-urgent packets ($\Omega_{non-rush}$) are considered.

For each packet, the modulation and coding scheme (MCS) enabling the best spectral efficiency on the link to be obtained (using the resource allocated in the previous step) is determined, in view of the packet error rate $PER_{target}$ imposed by the quality of service.

By modulation and coding scheme, it is conventionally meant a couple comprising, on the one hand, a modulation constellation and, on the other hand, an error correction code. L of a MCS scheme for a given link is also called link matching. To each MCS scheme corresponds a spectral efficiency λ.

The following table lists possible MCS schemes and, for each MCS scheme, the associated modulation constellation, the associated error correction code rate, and the corresponding spectral efficiency.

| MCS scheme | Modulation | Code rate | Spectral efficiency |
|---|---|---|---|
| 1 | QPSK | 1/3 | 2/3 |
| 2 | QPSK | 1/2 | 1 |
| 3 | QPSK | 2/3 | 4/3 |
| 4 | 16-QAM | 1/3 | 4/3 |
| 5 | QPSK | 3/4 | 3/2 |
| 6 | 16-QAM | 1/2 | 2 |
| 7 | 64-QAM | 1/3 | 2 |
| 8 | 16-QAM | 2/3 | 8/3 |
| 9 | 16-QAM | 3/4 | 3 |
| 10 | 64-QAM | 1/2 | 3 |
| 11 | 64-QAM | 2/3 | 4 |
| 12 | 64-QAM | 3/4 | 9/2 |

For each packet k and each allocated resource n, $MCS_{k,n}^{max}$ designates the modulation and coding scheme enabling the maximum spectral efficiency to be obtained on the link, designated $\lambda_{k,n}^{max}$, in view of the packet error rate ($PER_{target}$) corresponding to the required quality of service ($QoS_k$).

Let $MCS_{low-power}$ be a predetermined modulation and coding scheme being robust, in other words having a low spectral efficiency $\lambda_{low-power}$.

The $MCS_{low-power}$ scheme is a parameter for the scheduling method. According to an exemplary embodiment, the $MCS_{low-power}$ scheme is adaptively selected from a plurality of MCS schemes depending on the cell load: the spectral efficiency of the $MCS_{low-power}$ scheme is chosen as low as the cell load is high.

For each packet k, if $\lambda_{k,n}^{max} > \lambda_{low-power}$, the link is allocated the $MCS_{low-power}$ scheme instead of the $MCS_{k,n}^{max}$ optimum scheme. For a given target packet error rate $PER_{target}$, choosing a robust $MCS_{low-power}$ modulation and coding scheme enables to operate at a lower signal to noise ratio.

Figure 3:
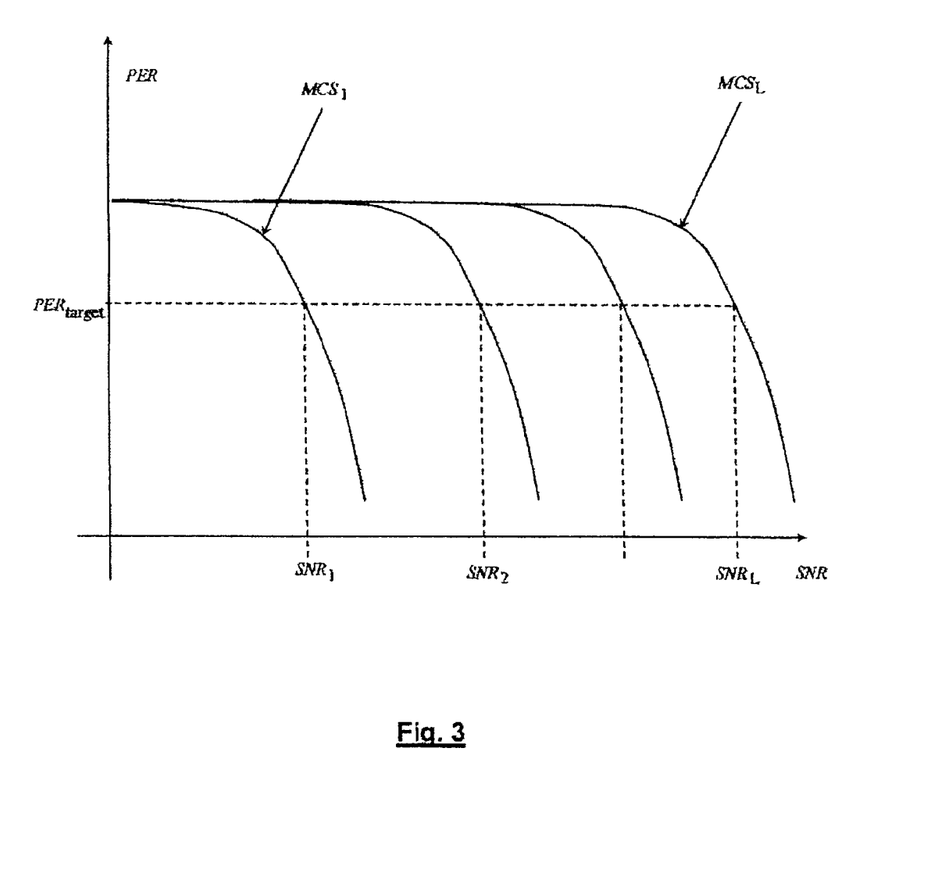
FIG. 3 represents, for a given link, the packet error rate depending on the signal to noise ratio, for a plurality of MCS modulation and coding schemes.

FIG. 3 represents the curves of the packet error rate as a function of the signal to noise ratio, for different modulation and coding schemes $MCS_1, MCS_2, \ldots, MCS_I$, of increasing spectral efficiencies.

It is seen that a same given packet error rate $PER_{target}$ can be achieved, with a MCS scheme having a high spectral efficiency, for a higher signal to noise ratio and, with a MCS scheme having a lesser spectral efficiency, for a lower signal to noise ratio.

Choosing a $MCS_{low-power}$ scheme having a low spectral efficiency therefore enables to operate at a lower signal to noise ratio for non-urgent packets and, consequently, to advantageously reduce the emission power used.

However, lowering the emission power of non-urgent packets does not alter urgent packets and the priority characteristics thereof. If need be, a reduction of emission power of urgent packets could however be performed if necessary to further reduce the energy necessary for transmitting all the packets.

Figure 4:
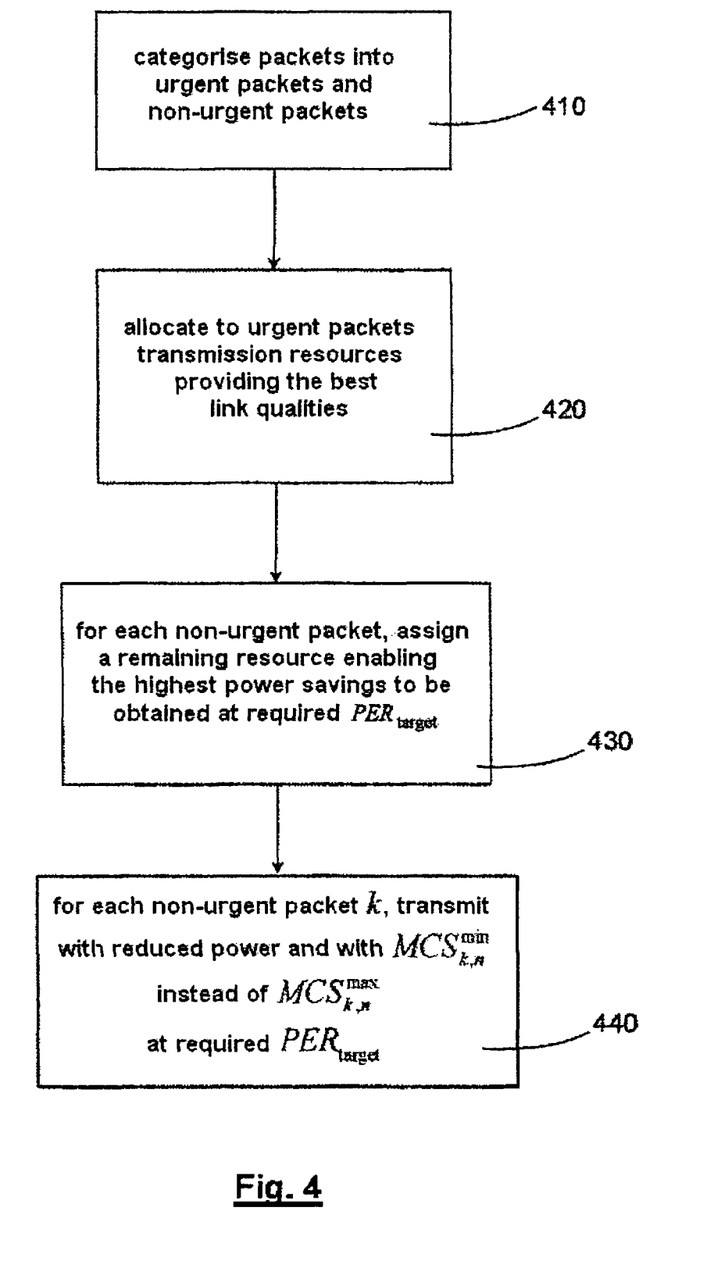
FIG. 4 schematically represents a scheduling method according to a second embodiment of the invention.

FIG. 4 represents a second embodiment of the invention.

Steps 410 and 420 are identical to steps 110 and 120 of the first embodiment, respectively.

In step 430, allocating the resources for non-urgent packets is performed. To do so, for each resource still available, it is determined the packet enabling the highest transmission power savings to be achieved while maintaining the quality of service, in other words $|SINR_{k,n}(MCS_{k,n}^{max}) - SINR_{k,n}(MCS_{k,n}^{min})|$ to be maximised, the $MCS_{k,n}^{max}$ scheme being as above the scheme having the highest spectral efficiency, and $MCS_{k,n}^{min}$ the scheme having the lowest spectral efficiency enabling the quality of service on the link to be ensured (packet error rate $PER_{target}$).

The packet achieving the highest power savings is then assigned the relevant resource.

In step 440, only non-urgent packets are again considered. Each packet k is then transmitted with the $MCS_{k,n}^{min}$ scheme with a reduced power corresponding to the signal to noise ratio $SINR_{k,n}(MCS_{k,n}^{min})$.

Figure 5:
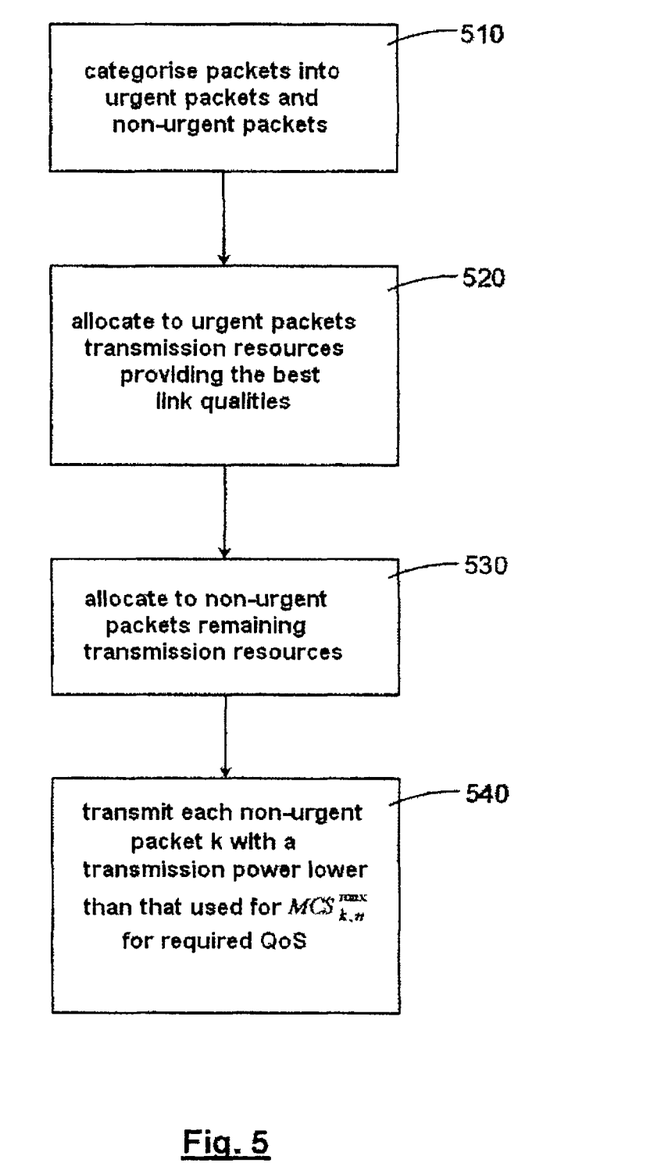
FIG. 5 schematically represents a scheduling method according to a more general embodiment of the invention.

FIG. 5 represents a scheduling method according to more general embodiment of the invention.

In step 510, packets from different users are categorised into urgent packets and non-urgent packets.

In step 520, urgent packets are assigned the transmission resources enabling the best link qualities to be obtained, giving preference to most urgent packets.

In step 530, non-urgent packets are assigned the remaining resources, that is those not assigned in step 520.

In step 540, each non-urgent packet is transmitted with a transmission power lower than that which would be necessary to transmit it with a maximum spectral efficiency, in view of the quality of service required on the link of the user, that is the target packet error rate ($PER_{target}$).

Those skilled in the art will understand that the scheduling method represented in FIG. 5 is a general form of those represented in FIGS. 1 and 4.

The invention claimed is:

1. A scheduling method in a multi-user communication system, said method assigning to each packet of a user a transmission resource from a plurality of transmission resources during a transmission time interval in order to transmit said packet over a link, the method comprising:
   (a) categorizing the packets from different users into urgent packets and non-urgent packets;
   (b) assigning to urgent packets transmission resources providing a highest link quality;
   (c) assigning to non-urgent packets the remaining transmission resources by assigning to each non-urgent packet a remaining transmission resource ensuring a highest link quality out of the remaining transmission resources after the urgent packets are already assigned transmission resources; and
   (d) transmitting each non-urgent packet using the thus assigned transmission resource and with a transmission power lower than that which would be necessary to transmit it with a maximum spectral efficiency, in view of a quality of service required on the link,
   the method further comprising, for each non-urgent packet, determining the modulation and coding scheme ($MCS_{n,k}^{max}$) with said maximum spectral efficiency ($\lambda_{n,k}^{max}$) and the emission power ($P_{n,k}^{max}$) for obtaining a quality of service ($QoS_k$) required on the link using the transmission resource ($RB_n$) assigned to the packet, checking whether this spectral efficiency ($\lambda_{n,k}^{max}$) is higher than that ($\lambda_{low-power}$) of a predetermined robust modulation and coding scheme and, if so, using in step (d) this robust scheme for transmitting said non-urgent packet with an emission power lower than that previously determined.

2. The scheduling method according to claim 1, further comprising, in step (b), assigning to the most urgent packets the transmission resources providing the highest link quality, a packet being assigned a transmission resource providing a link quality as high as such packet is urgent.

3. The scheduling method according to claim 1, wherein, if a packet belongs to a flow of the real time type, it is categorized as urgent if its remaining lifetime is lower than a predetermined threshold time value and as non-urgent in the opposite case.

4. The scheduling method according to claim 1, wherein, if a packet belongs to a flow of the non real time type, it is categorized as urgent if the flow to which it belongs has not been served until then at the quality of service required for this flow.

5. The scheduling method according to claim 1 or 2, further comprising:
   in step (c): assigning a remaining transmission resource to a packet for which maximum power savings may be obtained, at the required quality of service, between a first modulation and coding scheme and a second modulation and coding scheme, said first scheme ($MCS_{k,n}^{max}$) having a maximum spectral efficiency from a plurality of possible schemes, said second scheme ($MCS_{k,n}^{min}$) having a minimum spectral efficiency from the same plurality;
   in step (d): using the second scheme for transmitting said packet with said low transmission power.

6. A scheduling method in a multi-user communication system, said method assigning to each packet of a user a transmission resource from a plurality of transmission resources during a transmission time interval in order to transmit said packet over a link, the method comprising:
   (a) categorizing the packets from different users into urgent packets and non-urgent packets;
   (b) assigning to urgent packets transmission resources providing a highest link quality;
   (c) assigning to non-urgent packets the remaining transmission resources; and
   (d) transmitting each non-urgent packet using the thus assigned transmission resource and with a transmission power lower than that which would be necessary to transmit it with a maximum spectral efficiency, in view of a quality of service required on the link,
   wherein, the system being of the HARQ type, if a packet belongs to a flow of the real time type, it is categorized as urgent if its remaining lifetime is lower than a predetermined threshold time value minus a time margin depending on the maximum number of retransmissions of the packet and as non-urgent in the opposite case.

7. A scheduling method in a multi-user communication system, said method assigning to each packet of a user a transmission resource from a plurality of transmission resources during a transmission time interval in order to transmit said packet over a link, the method comprising:
   (a) categorizing the packets from different users into urgent packets and non-urgent packets;
   (b) assigning to urgent packets transmission resources providing a highest link quality;
   (c) assigning to non-urgent packets the remaining transmission resources; and
   (d) transmitting each non-urgent packet using the thus assigned transmission resource and with a transmission power lower than that which would be necessary to transmit it with a maximum spectral efficiency, in view of a quality of service required on the link,
   wherein, if a packet belongs to a flow of the real time type, it is categorized as urgent if its remaining lifetime is lower than a predetermined threshold time value and as non-urgent in the opposite case, and
   wherein the predetermined threshold time value is determined by an admission procedure for admitting users into said communication system.

8. A scheduling method in a multi-user communication system, said method assigning to each packet of a user a transmission resource from a plurality of transmission resources during a transmission time interval in order to transmit said packet over a link, the method comprising:
   (a) categorizing the packets from different users into urgent packets and non-urgent packets;
   (b) assigning to urgent packets transmission resources providing a highest link quality;
   (c) assigning to non-urgent packets the remaining transmission resources; and
   (d) transmitting each non-urgent packet using the thus assigned transmission resource and with a transmission power lower than that which would be necessary to transmit it with a maximum spectral efficiency, in view of a quality of service required on the link,
   wherein, if a packet belongs to a flow of the non real time type, it is categorized as urgent if the flow to which it belongs has not been served until then at the quality of service required for this flow, and
   wherein a packet k belonging to a flow i is considered as urgent at the time $t_i$ if $(TW_i - t_i) \leq (QoS_i - q_i)/R_{min}$ where $TW_i$ is the duration of an observation window, $t_i$ is the time elapsed since the beginning of this window, $QoS_i$ is the quality of service required for the flow i, expressed as the amount of data to be transmitted during said observation window, $q_i$ is the amount of data actually transmitted since the beginning of the observation window and $R_{min}$ is the minimum rate on the link.

* * * * *